United States Patent

[11] 3,618,989

[72] Inventor Yoshinori Ito
 Kawasaki-shi, Japan
[21] Appl. No. 6,249
[22] Filed Jan. 27, 1970
[45] Patented Nov. 9, 1971
[73] Assignee Kabushiki Kaisha Tokuda Seisakusho
 Kanagawa-ken, Japan
[32] Priority Jan. 28, 1969
[33] Japan
[31] 44-6855

[54] SEALING MEANS
 2 Claims, 2 Drawing Figs.
[52] U.S. Cl. ................................................ 285/336,
 277/236, 285/DIG. 18, 285/363
[51] Int. Cl. ........................................................ F16l 17/00
[50] Field of Search .................................... 285/336,
 363, DIG. 18; 277/235, 236, 170, 171, 172

[56] References Cited
 UNITED STATES PATENTS
1,873,855 8/1932 Wilson ........................ 285/336
2,413,308 12/1946 Arnold ........................ 285/336 X
2,422,009 6/1947 Goetze ........................ 285/336
 FOREIGN PATENTS
507,468 10/1927 Germany ..................... 285/336

Primary Examiner—Dave W. Arola
Attorney—Waters, Roditi, Schwartz & Nissen

ABSTRACT: A fluidtight pipe coupling of the type comprising a pair of opposed annular flanges secured on the abutting ends of pipes to be coupled, opposed annular grooves formed in the opposing faces of the flanges, an annular metallic gasket disposed in the annular grooves. Each of the grooves has an outer cylindrical sidewall and an inner conical sidewall having diameters decreasing toward the mating groove. The gasket is of rectangular cross section and the inner corner or edges thereof are in tight engagement with the conical walls, the outer cylindrical wall of the gasket being slightly spaced apart from the outer walls of the grooves.

PATENTED NOV 9 1971  3,618,989

3,618,989

SEALING MEANS

BACKGROUND OF THE INVENTION

This invention relates to sealing means and joints, more particularly to fluidtight joints of the type comprising a pair of annular flanges opposed in face to face relationship, opposed annular grooves respectively formed in the opposing faces of the flanges, an annular metallic gasket disposed in said annular grooves, and clamping means.

Fluidtight joints of the above stated type are known. However, these joints have been unsatisfactory in performance under high pressure or vacuum and/or high temperature.

SUMMARY OF THE INVENTION

It is an object of this invention to provide a novel and improved sealing joint of the above stated type which can resist high fluid pressure or vacuum even under high temperature.

Briefly stated, the sealing joints of this invention is characterized by the improvement wherein each of the grooves respectively formed in the opposed faces of the mating joint flanges is defined by a radially outer cylindrical sidewall, a radially inner conical sidewall having diameters gradually decreasing toward the mating groove, and a bottom wall, and wherein the annular metallic gasket disposed in said opposed grooves is of substantially rectangular cross section and has an inner diameter in the range of the diameters of the conical inner wall of the grooves, an outer diameter less than that of the outer diameter of the grooves, and an axial length enabling it to provide a space between the opposing faces of the flanges.

DETAILED DESCRIPTION

Throughout this disclosure, directional terms such as "radially," "outer," and "inner" are used with respect to the axis or axes of two pipes and the like coupled by the joint.

Figure 1:
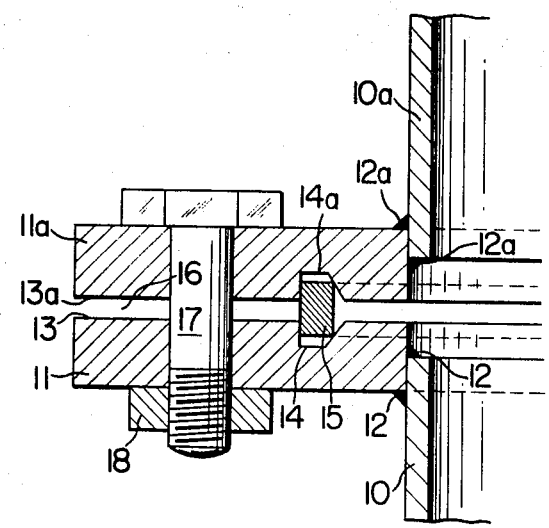
FIG. 1 is a fragmentary longitudinal section of a fluidtight joint according to this invention.

Referring now to FIG. 1, pipes 10 and 10a are to be coaxially coupled at their ends which have rigidly secured thereto radially extending joint flanges 11 and 11a, respectively. These flanges 11 and 11a are shown as rigidly connected to the pipes at 12 and 12a by welding, but may be integral with the pipes.

The joint flanges 11 and 11a have opposed faces 13 and 13a which are formed with axially opposed annular grooves 14 and 14a, respectively. These grooves cooperate to form an annular space between the flanges.

Within the annular space, there is disposed an annular gasket 15 of an axial dimension to retain an axial gap 16 between the flanges 10 and 10a.

The flanges 11 and 11a are clamped toward each other by bolts 17 and nuts 18.

Figure 2:
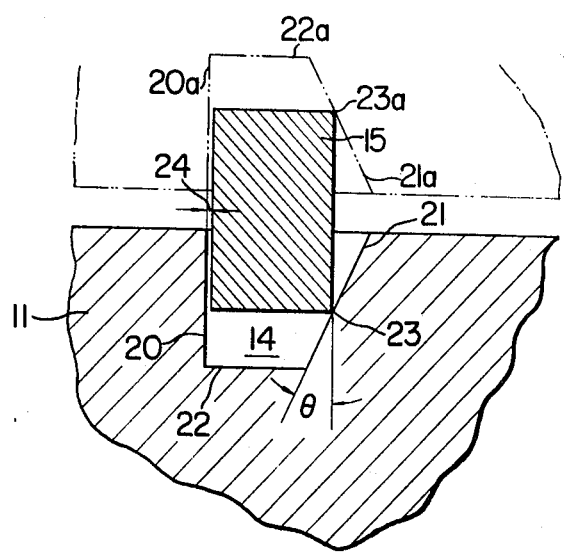
FIG. 2 is a relatively enlarged fragmentary section, of a part of FIG. 1.

The novel fluidtight arrangement according to this invention is shown in detail in FIG. 2. Since the flanges 11 and 11a are identical in construction to each other, only the flange 11 will be described in detail.

As shown, the annular groove 14 formed in the flange 11 is defined by a radially outer cylindrical sidewall 20 extending parallel to the common axis (not shown) of the pipes 10 and 10a, a radially inner conical sidewall 21, and a bottom wall 22. The conical sidewall 21 forms an angle $\theta$ relative to the axis of the pipes.

The gasket 15 is typically made of aluminium, but may be made of any metal or alloy of a medium hardness which may be slightly deformed or collapsed when subjected to pressure of contact by any other hard material. The gasket is shown as of rectangular cross section but may be of any other form similar to the rectangular configuration.

When clamped between the grooves 14 and 14a, the circular corner edges 23 and 23a of the gasket 15 on the radially inner side thereof are pressed against the conical sidewall 21 and 21a. Furthermore, the dimensions of the gasket 15 are such that there is left a slight annular gap 24 between the walls 20 and 20a and the gasket 15 when the latter is clamped between the flanges and that there are left axial gaps between the gasket and the bottom walls 22 and 22a of the grooves.

When the nuts 18 are tightened with the gasket 15 disposed within the grooves 14 and 14a, the corner edges 23 and 23a on the gasket move relative to the grooves toward the bottoms 22 and 22a, keeping frictional line contacts with the conical walls 23 and 23a. In this case, if the angle $\theta$ is at least less than 45°, the gasket 15 will exert a wedging action on the walls of the grooves and it is possible to obtain a large force of line contact between the edges 23 and 23a and the conical walls of the grooves and it is possible to obtain a large force of line contact between the edges 23 and 23a and the conical walls 21 and 21a with a relatively small clamping force applied by the bolts and nuts. This means that a sealing engagement tighter than that obtainable heretofore can be obtained by the same amount of the clamping force.

When the clamping force is imposed on the gasket 15 and the corner edges 23 and 23a on the gasket are slightly deformed or collapsed by the wedging action, the lines of contact between the edges 23 and 23a and the conical walls 21 and 21a will naturally have a slight width, whereby the fluidtightness will become higher.

On the other hand, continued clamping force acting on the gasket through the conical walls 21 and 21a will tend to increase the diameter of the gasket, so that the annular gap 24 existing originally between the cylindrical walls 20 and 20a and the outer wall of the gasket will gradually be reduced. When the gap 24 has disappeared by the contact of the gasket with the walls 20 and 20a due to the continued reaction of the latter, the gasket will be prevented from being increased in diameter and, at the same time, will produce a positive force resisting the action of the conical walls. Therefore, the gasket is capable of providing a sealing action more stable and stronger than that obtainable only by the substantially line contact between the edges 23 and 23a and the conical walls 21 and 21a.

Furthermore, it will readily be apparent that since the coupling according to this invention employs only the metallic parts, it is suitable for use under high pressure or vacuum and at high temperature and is durable.

While a preferred embodiment of the invention has been shown and described, it is to be understood that the invention may be embodied in other modified forms without departing from the spirit and scope of the invention.

Further, it is to be understood that while the invention has been described hereinabove as applied to a pipe coupling, it may be applied with equal effectiveness to any fluidtight joints for use with pressure-retaining shells or tanks and the like.

I claim:

1. In a fluidtight joint of the type comprising a pair of annular radial flanges secured on abutting parts of structures to be coupled and opposed in face-to-face relationship, opposed annular grooves respectively formed in the opposed faces of said flanges and cooperating to form an annular space between the flanges, each of said grooves being defined by a bottom wall, a radially outer cylindrical sidewall and a radially inner conical sidewall, said inner sidewalls having diameters decreasing toward the opposed flange faces of the mating groove, an annular one-piece metallic gasket disposed in said annular space, and means for clamping said gasket between said flanges; the improvement comprising; said annular gasket, when not clamped, being of a rectangular cross section and having a radially inner cylindrical surface of a diameter within the range of the diameters of said inner conical walls of said grooves, a radially outer cylindrical surface of a diameter less than that of the outer sidewalls of said grooves, said gasket having a pair of radially inner annular corner edges engaging along lines of contact said conical sidewalls of said grooves, respectively; the diameter of said outer cylindrical surface of the gasket being dimensioned that upon the gasket being clamped and deformed radially outwardly by the action of said conical sidewalls of the grooves said outer cylindrical surface of the gasket is contacted and opposed by said outer cylindrical sidewalls of the grooves to produce a positive force resisting the action of the conical sidewalls, so as to provide a constant and firm sealing relationship between said conical sidewalls and said corner edges and said gasket and grooves being so dimensioned and arranged that said gasket will not contact said bottom walls and said flanges will not contact each other under clamping pressure.

2. The fluidtight joint as set forth in claim 1, wherein the angle formed between the conical wall and a line parallel to the axis of the joint in a plane passing through said axis is less than 45°.

* * * * *